(12) United States Patent
Taffet (10) Patent No.: US 8,337,206 B2
(45) Date of Patent: Dec. 25, 2012

(54) TOOL FOR ASSISTING IN THE DESIGN OF AN AIRCRAFT FLIGHT DECK COMPATIBLE WITH A NIGHT VISION SYSTEM

(75) Inventor: Bruno Taffet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1076 days.

(21) Appl. No.: 11/686,656

(22) Filed: Mar. 15, 2007

(65) Prior Publication Data
US 2007/0218428 A1 Sep. 20, 2007

(30) Foreign Application Priority Data
Mar. 15, 2006 (FR) .................................... 06 50879

(51) Int. Cl.
*G09B 9/05* (2006.01)
(52) U.S. Cl. ............... 434/38; 434/29; 434/30; 434/36; 434/41; 362/471
(58) Field of Classification Search .............. 434/36, 434/41, 29, 30, 38; 362/471
See application file for complete search history.

(56) References Cited

U.S. PATENT DOCUMENTS

| | | | | |
|---|---|---|---|---|
| 2,510,848 A * | 6/1950 | Wood | ............................... | 434/36 |
| 3,693,265 A | 9/1972 | Alexander et al. | | |
| 4,580,196 A * | 4/1986 | Task | ............................... | 362/471 |
| 4,722,028 A * | 1/1988 | Brannon et al. | ................ | 362/29 |
| 4,849,755 A * | 7/1989 | Benas | ............................ | 340/946 |
| 5,049,869 A * | 9/1991 | Harris | ........................ | 340/815.4 |
| 5,083,246 A * | 1/1992 | Lambert | ........................ | 362/471 |
| 5,380,204 A * | 1/1995 | Decker | ............................ | 434/36 |
| 5,567,937 A * | 10/1996 | Pinkus | ....................... | 250/252.1 |
| 6,196,845 B1 * | 3/2001 | Streid | ............................ | 434/44 |
| 6,422,723 B1 * | 7/2002 | Walters | ........................ | 362/471 |
| 6,590,560 B1 * | 7/2003 | Lucas | ............................ | 345/102 |
| 6,758,586 B1 * | 7/2004 | Wilhem et al. | ............... | 362/471 |
| 7,200,536 B2 * | 4/2007 | Wynn | ............................... | 703/7 |
| 7,552,037 B2 * | 6/2009 | Miller | ............................... | 703/2 |
| 2007/0085485 A1 * | 4/2007 | Flickinger et al. | ............ | 315/201 |
| 2007/0218428 A1 * | 9/2007 | Taffet | .............................. | 434/41 |

FOREIGN PATENT DOCUMENTS
EP 0 301 563 A2 2/1989
EP 1 491 444 A1 12/2004

OTHER PUBLICATIONS

Department of Defense Interface Standard, Lighting, Aircraft, Nigh Vision Imaging System (NVIS) Compatible, Feb. 2, 2001.*

* cited by examiner

Primary Examiner — Kang Hu
(74) Attorney, Agent, or Firm — Oblon, Spivak, McClelland, Maier & Neustadt, L.L.P.

(57) ABSTRACT

The invention relates to a tool (10) for assisting in the design of an aircraft flight deck compatible with a night vision system, comprising a closed chamber (12) functioning as a dark room and containing:
 a mockup (14) that reproduces the interior of a flight deck and is representative of the visual characteristics of the station, the mockup integrating equipment items that are representative of a flight deck and that are capable of reproducing a plurality of possible illumination configurations of the flight deck on command,
 a light source (22) capable of reproducing at least one level of darkness in the chamber.

24 Claims, 8 Drawing Sheets

TOOL FOR ASSISTING IN THE DESIGN OF AN AIRCRAFT FLIGHT DECK COMPATIBLE WITH A NIGHT VISION SYSTEM

The invention relates to a tool for assisting in the design of an aircraft flight deck compatible with a night vision system.

The use of night vision systems on board certain aircraft has been considered in order to improve the vision of pilots during night flights.

For example, the pilots thus can be equipped with binoculars for night vision ("night vision goggles" in English terminology), which are mounted on their helmet. By virtue of an articulated device, the goggles can be positioned in front of the eyes of the pilot or can be shifted and kept in a position situated outside his field of vision.

The principle of such goggles is based on binocular amplification using third-generation image-amplification tubes.

These goggles equipped with such amplification tubes prove to be extremely sensitive to electromagnetic emissions in the 600 nm to 900 nm spectral band, which ranges from orange to the near infrared.

In such a night vision system, the photons arriving from an outside scene are converted to electrons by means of a gallium arsenide photocathode.

The electrons created by the conversion are then amplified, after which they impinge on a phosphor screen, where they are then converted to visible light. It will be noted that such night vision goggles amplify the intensity of the light rays by a factor equal to approximately 2000.

Thus, if the light sources situated in the flight deck of the airplane emit energy in the spectral band of sensitivity of the night vision goggles, they can cause a dazzling haze capable of degrading the image that these goggles reconstruct for the pilot.

Another result can be irreversible degradation of these goggles due to burnup of the phosphor constituting the screen.

In order to remedy these problems, the night vision goggles are generally equipped with an automatic gain control device, which detects emission of energy in the spectral band of sensitivity of these eyepieces and consequently reduces the image amplification factor.

However, the night vision goggles then become less sensitive to the outside scene passing before the pilot's eyes.

The invention intends to remedy at least one of the foregoing disadvantages by providing a tool for assisting in the design of an aircraft flight deck compatible with a night vision system, comprising a closed chamber functioning as a dark room and containing:

a mockup that reproduces the interior of a flight deck and is representative of the visual characteristics of the station, the mockup integrating equipment items that are representative of a flight deck and that are capable of reproducing a plurality of possible illumination configurations of the flight deck on command, a light source capable of reproducing at least one level of darkness in the chamber.

By virtue of such a tool, illumination tests activated by different equipment items of the cockpit are performed in order to verify whether these equipment items for which the environment and conditions of use have been reproduced are compatible with a night vision system.

It is possible selectively to illuminate a single equipment item or a plurality thereof and even all equipment items of the flight deck, and to analyze the illumination resulting from the equipment alone or the combined illumination resulting from a plurality of equipment items. The equipment item or items are placed in the mockup in the position that they occupy in a real cockpit.

Qualitative measurements can be performed with a pilot equipped with a night vision system. The pilot determines if the luminous energy emitted by the equipment items being subjected to a given controlled illumination condition causes dazzle (incompatibility with the night vision system) or does not cause dazzle (compatibility), if the illumination generated by the equipment items offers him visual comfort, etc.

The results of these measurements may, for example, lead to an adaptation of the illumination rules for certain equipment items, to spatial rearrangement of certain illuminating elements (relocation of a button of a luminous indicator, etc.), to modification of equipment items by the suppliers and to improvement of the ergonomics of the flight deck.

The tool according to the invention therefore makes it possible to design a flight deck in which the different equipment items (cockpit screens, head up displays, control panel displays, ambient lights, etc.) emit luminous energy in a spectral band that has the least possible overlap with the spectral band of sensitivity of the night vision systems.

This tool also makes it possible to perfect the spatial arrangement of the different illuminated equipment items relative to each other and even the spatial arrangement of different illuminated elements within the same equipment item (dials, switches, buttons, rotary selectors known as "rotators" in English terminology, unstable two-position buttons known as "rocker switches" in English terminology).

According to one characteristic, the tool additionally comprises, in the interior of the chamber, an apparatus for measuring at least one physical variable relating to the illumination of equipment items of the flight deck that are in a predefined, activated state of illumination.

Such a measuring apparatus, mounted, for example, in the mockup of the interior of the flight deck, makes it possible to perform quantitative measurements of physical variables, such as chromaticity, spectral radiance, luminance and illuminance for one or more equipment items placed in their real conditions of use in an aircraft cockpit.

By comparing the results of these measurements with standard reference data specifying the constraints to be respected in order to ensure compatibility with a night vision system, it is possible to verify that one or more illuminated equipment items, taken together or separately, will exhibit such compatibility.

Nevertheless, it will be noted that it can prove useful to correlate the results of the aforesaid qualitative measurements with those of the quantitative measurements in order to increase the reliability of design of the flight deck.

According to one characteristic, the tool is provided with at least one illumination control unit connected to the different equipment items and permitting the illumination of such items to be activated appropriately.

According to one characteristic, the said at least one illumination control unit is mounted in the chamber.

According to one characteristic, the said at least one physical variable to be measured is chosen from among at least one of the following variables: chromaticity, spectral radiance, luminance, illuminance.

According to one characteristic, the measuring apparatus is a spectroradiometer.

According to one characteristic, the light source is capable of reproducing a plurality of darkness levels.

According to one characteristic, the tool is provided with at least one attenuating filter associated with the light source for each darkness level.

According to one characteristic, the tool is provided with a resolution pattern mounted opposite the mockup and illuminated by the light source.

According to one characteristic, the night vision system comprises night vision goggles.

According to one characteristic, the mockup is also representative of the tactile characteristics of the flight deck.

The tactile characteristics participate in the ergonomics of the flight deck.

The invention also has as an object a method that implements the tool mentioned hereinabove and that includes the following steps:

- measurement of at least one physical variable relating to the illumination generated by one or more equipment items of the flight deck that are in a predefined, activated state of illumination,
- comparison of the measurement result with reference data defining compatibility relative to night vision systems,
- depending on the result of the comparison, decision as to whether the said at least one physical variable measured for one or more equipment items in the predefined, activated state of illumination is compatible with a night vision system.

According to one characteristic, the method includes a step of activation of a predefined state of illumination of one or more equipment items.

The activation step can take place before and/or after the measurement step.

Other characteristics and advantages will become apparent in the course of the description hereinafter, given solely by way of non-limitative example with reference to the attached drawings, wherein.

Figure 1:
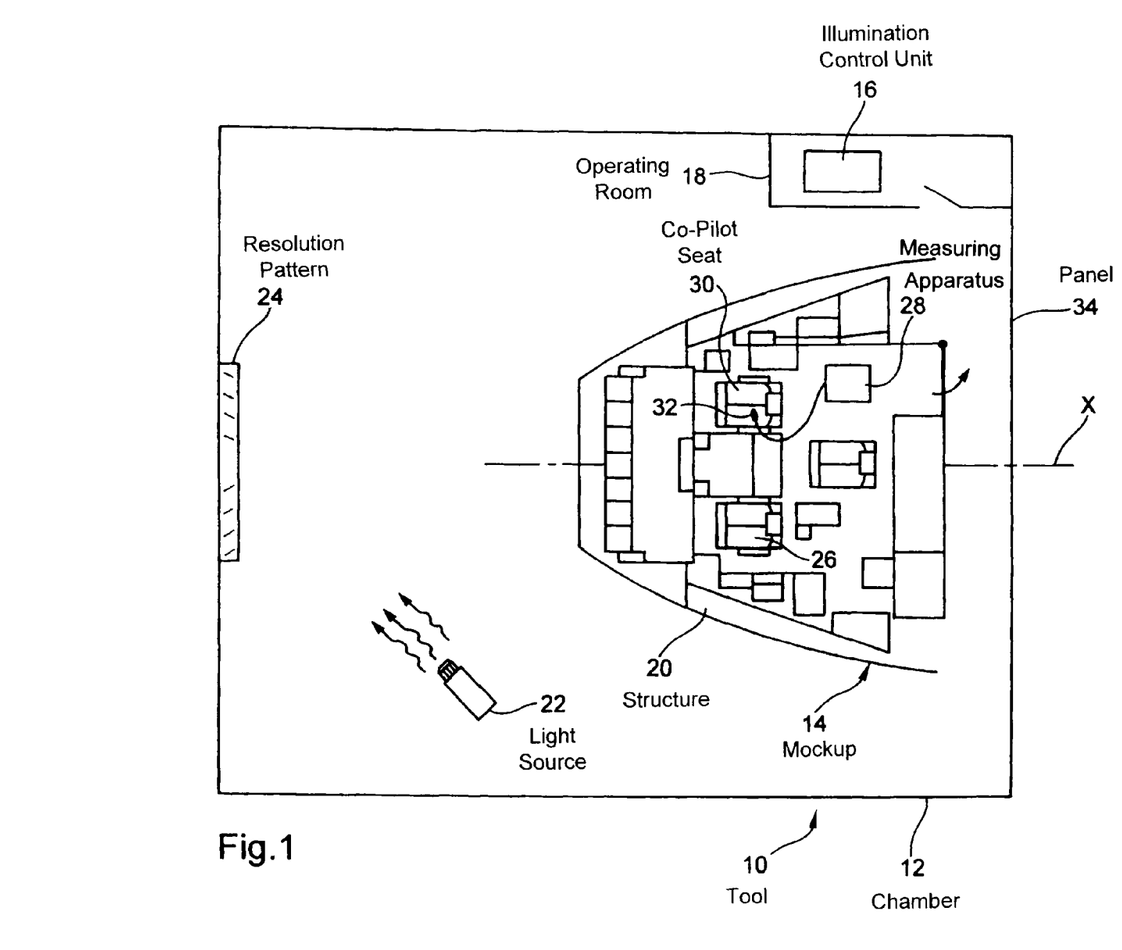
FIG. 1 is a schematic view representing the tool for assisting in the design of an aircraft flight deck according to the invention.

As illustrated in FIG. 1 and denoted by general reference numeral 10, a tool for assisting in the design of an aircraft flight deck compatible with a night vision system is provided with a plurality of elements contained inside a closed chamber 12, which functions as a dark room.

Inside this chamber there is mounted a mockup 14, which reproduces in real size the interior of an aircraft flight deck.

This mockup is representative of the visual and tactile characteristics of the flight deck.

For this purpose, the mockup integrates illuminable equipment items that are representative of what is found in an aircraft flight deck at the same place that they occupy in such an area.

For simplicity, the equipment items are, for example, airplane components that are those found in real cockpits.

The equipment items used in mockup 14 are capable of reproducing, on the basis of instructions issued from an illumination control unit 16, a plurality of possible illumination configurations of the flight deck that are supposed to represent the majority or even the totality of real illumination conditions.

Illumination control unit 16 is connected (for clarity, in a manner not illustrated in FIG. 1) to different equipment items of flight deck 14, thus permitting data for activation of illumination of these equipment items to be transmitted thereto.

It will be noted that illumination control unit 16 is mounted in chamber 12, and more particularly is located inside an operating room 18 situated in this chamber, close to the entrance thereof.

During tests, this room is hermetically sealed in order to prevent any light from escaping from this room and disrupting the illumination conditions in the mockup, and more generally in chamber 12.

Mockup 14 is provided with a structure 20 (support structure, frames, skin, window frames, floor, etc.) that reproduces as faithfully as possible the exterior and interior shapes of the part of the airplane in which the flight deck is located.

Tool 10 is also provided with a light source 22, which is capable of reproducing at least one darkness level inside chamber 12. In practice, this source is capable of reproducing five distinct darkness levels, as will be seen in detail hereinafter.

It will be noted that light source 22 is provided with at least one attenuating filter associated therewith and used for each darkness level that the light source is caused to reproduce.

Tool 10 is also provided with a resolution pattern 24 mounted opposite the mockup and more particularly disposed according to the longitudinal axis X thereof, perpendicular to that axis.

This resolution pattern is disposed at one end of chamber 12, while mockup 14 is disposed at the opposite end along longitudinal direction X.

More particularly, the resolution pattern is disposed at a distance of 20 feet (6.096 m) from the pilot's eye in FIG. 1.

The resolution pattern constitutes a target that has dimensions of 0.6 m×0.5 m (the dimensions of the different elements of the tool and their distance relative to one another do not correspond to reality) which is composed of three bars, more or less spaced apart from one another, having different heights, of black color on a white background, and the contrast between the bars and the background of the target is at least 70%.

This resolution pattern designed by the USAF in 1951 constitutes a standard.

The pilot, wearing a night vision system such as night vision goggles and installed in seat 26 inside mockup 14, must be capable of distinguishing one element of the resolution pattern among others.

Tool 10 is also provided with a measuring apparatus 28, mounted in the mockup of the interior of the flight deck.

This apparatus is placed behind copilot's seat 30, for example, and is equipped with an offset sensor 32 making it possible to take measurements at different points of the flight deck, including, for example, at the position of the eye of the pilot or copilot.

The function of measuring apparatus 28 is to measure one or more physical variables relating to the illumination generated by equipment items of the flight deck when these are in a predefined state of illumination activated by control unit 16 and/or by another control unit.

Measuring apparatus 28 makes it possible to measure quantitatively, at any point of mockup 14, the illumination generated by the equipment items of the flight deck over the entire spectral band extending from the visible to the infrared and comprising wavelengths ranging from 380 nm to 930 nm.

More generally, this measuring apparatus, which is a commercial spectroradiometer (apparatus sold by Opronic Laboratories under the commercial designation OL750), is capable of measuring the luminous characteristics (physical variables) of equipment items, or in other words their luminance or their illuminance, their chromaticity (colorimetry) and their spectral radiance.

Measuring apparatus 28 is sensitive to very low light levels (0.7 mlux), making measurements possible even at the highest darkness level (and even nighttime level 5 hereinafter).

Light source 22 illuminates the high-contrast resolution pattern with illumination capable of reproducing a plurality of given darkness levels in the interior of chamber 12.

The predefined darkness levels correspond respectively to a plurality of nighttime luminous environments, which range from level 1, corresponding to a bright night with a full moon and clear sky, to level 5, corresponding to a dark black night with a new moon, overcast sky and no ground illumination.

The five darkness levels are quantified as follows:
level 1, corresponding to an illuminance of greater than 40 mlux;
level 2, corresponding to an illuminance of between 10 and 40 mlux;
level 3, corresponding to an illuminance of between 2 and 10 mlux;
level 4, corresponding to an illuminance of between 0.7 and 2 mlux;
level 5, corresponding to an illuminance of less than 0.7 mlux.

Source 22 possesses three fundamental properties:
it is capable of emitting uniformly over the entire visible spectrum and the near infrared, which corresponds to a wavelength range of between 380 and 930 nm,
it emits a calibrated low level of luminance over the five darkness levels defined in the standards of the aeronautics field and repeated in the foregoing (level 1 corresponding to a full moon and level 5 corresponding to the worst darkness level) and
the lamp of this source is stable in time.

More particularly, light source 22 is a source of the QTH type (quartz, tungsten, halogen) having the following characteristics:
the light source has low power (between 10 and 20 W), which causes only slight heat dissipation, obviating the need for a fan, limited light leakage and reduced specific illumination;
this source is used with a low-voltage d.c. power supply, thus making it possible to avoid undulations in the luminous flux;
the luminous flux can also be regulated by virtue of the use of a regulable stabilized power supply;
the luminous flux emitted by the source covers a horizontal angle of 4.7 degrees and a vertical angle of 5.7 degrees;
the lamp of the light source is placed in a box, wherein one of the six faces has an orifice through which the light beam emitted by the source can be channeled toward the resolution pattern; in this way it is ensured that the light does not diffuse in all directions.

It will be noted that the characteristics just enumerated are characteristics specific to the source and to the conditions of use thereof.

Calibration of the aforesaid five darkness levels is then achieved by virtue of a set of attenuating filters, whose operating principle is filtering by absorption.

Each attenuating filter has a different density and thus obeys known absorption curves.

A filter holder not illustrated in FIG. 1 is mounted on the box of light source 22 in order to accommodate the filters, which are made in the form of square glass plates.

As many as three filters can be placed in the filter holder.

In this way source 22 is capable of reconstructing the operating environment of the aircraft, or in other words of simulating nighttime with a plurality of predefined darkness levels.

Chamber 12 functioning as dark room is associated with light source 22 in order to reconstruct this operating environment of the aircraft.

As an example, chamber 12 has the following dimensions: 11 meters in length, 9 meters in width and 4.5 meters in height.

Chamber 12 is provided with a large opening of 4.3 meters in width and 3.4 meters in height, closed by a panel 34, which is demountable and thus makes it possible to introduce the mockup of the flight deck into the chamber in one or more pieces.

The different boundaries (wall and ceiling) of chamber 12 are coated with a matt black paint that is compatible with the night vision goggles. A matt black carpet that is also compatible with these night vision goggles covers the floor of chamber 12.

The different light leakages that can exist in the walls defining the chamber were detected by using night vision goggles and then sealed with foam sealants, for example.

It will be noted that all standard elements equipping the chamber (neon lighting, 220 V outlet with socket cover, fire detector, air-conditioning screen, network and telephone outlet) are black in color.

Chamber 12 is also equipped with 115 V/400 Hz, 32 V, 28 V and 5 V electrical outlets for operation of the mockup.

Chamber 12 therefore makes it possible to perform the different tests of compatibility with night vision goggles and also makes it possible to detect and correct the light leakages that can occur in the flight deck.

In the case of non-abutting mounting in particular, leakages can appear between the illuminated equipment items at the level of the floor of the flight deck, or else between a button and the front face of the equipment item on which it is located.

Mockup 14 comprises the entirety of the equipment items normally found in an aircraft flight deck, or in other words the cockpit display screens of PFD type (an acronym for "Primary Flight Display" in English terminology), DMAP (an acronym for "Display Master Annunciator Panel" in English terminology), MFD (an acronym for "Multifunction Display" in English terminology), the head up displays, also nicknamed HUD (an acronym for "Head Up Display" in English terminology), the control panel displays, the backlit front faces of the panels, the luminous indicators, the ambient lights (reading lamps, etc.), and so on.

These diverse equipment items are integrated into the mockup in the exact position that they occupy in a real aircraft cockpit.

It will also be noted that all of the components used in the flight deck are treated individually in such a way that they are compatible in themselves with the night vision system being used.

Examples of such components are buttons, paints coating the inside walls of the mockup, the windshield, optics of the head up displays, liquid crystal display panels of screens, etc.

Figure 2:
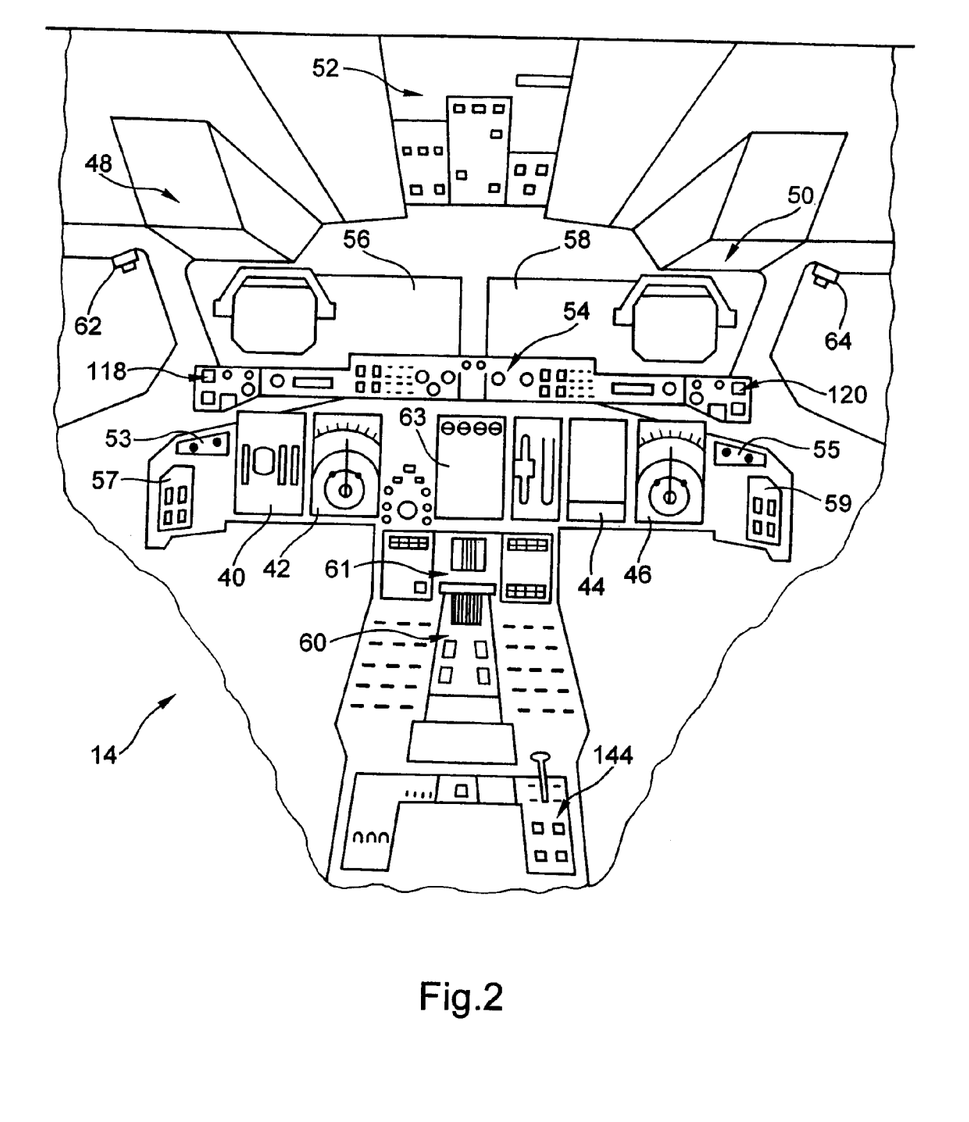
FIG. 2 represents a perspective view of a mockup of a flight deck according to the invention and of different equipment items of which it is composed.

FIG. 2 schematically shows a perspective view of the interior of the flight deck of mockup 14.

On this figure there are distinguished, on the one hand, the cockpit display screens, such as screens 40, 42, 44, 46 and head up displays 48 and 50, and, on the other hand, control panel displays, such as the displays of control panel ICP ("Integrated Control Panel") 52 situated on the ceiling of the mockup, the displays of control panel 54 dedicated to the automatic pilot and disposed under panes 56 and 58, the displays of control panel 60 (automatic pilot, throttle control lever, etc.), "visual units" 53, 55, 57, 59, 61, 63, which are simple control panels (without calculator) equipped with buttons with indicators, and the working and inspection lights, such as reading lamps 62 and 64.

The majority of these different types of equipment items are activated by control unit 16 of FIG. 1, with the exception of the diverse working and inspection lights and of the ambient lights, which are completely independent. Each of these latter devices effectively has a regulating element (such as a potentiometer) situated on the light itself or elsewhere in the cockpit.

Figure 3:
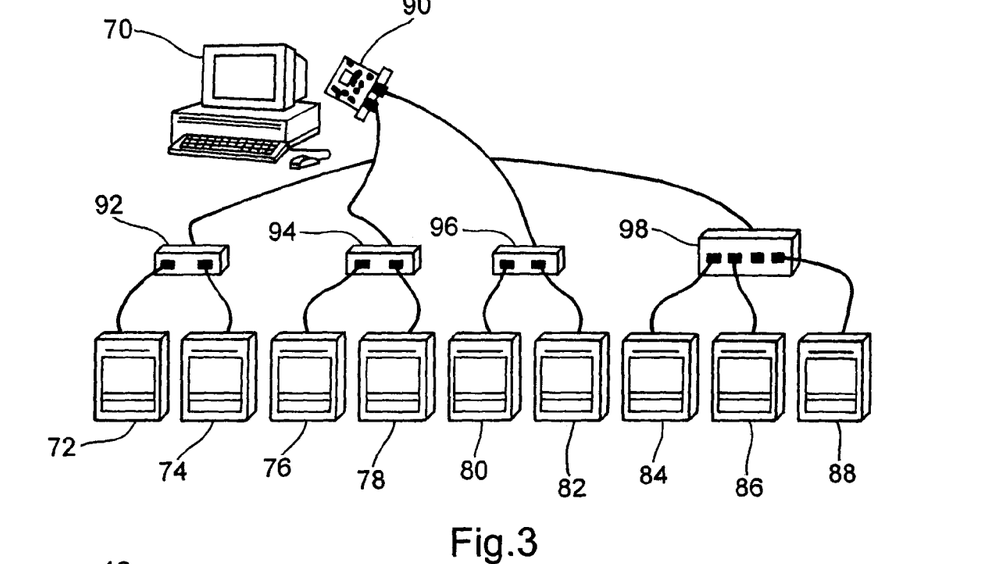
FIG. 3 is a schematic view of the master control architecture of the cockpit screens displays.
Figure 4:
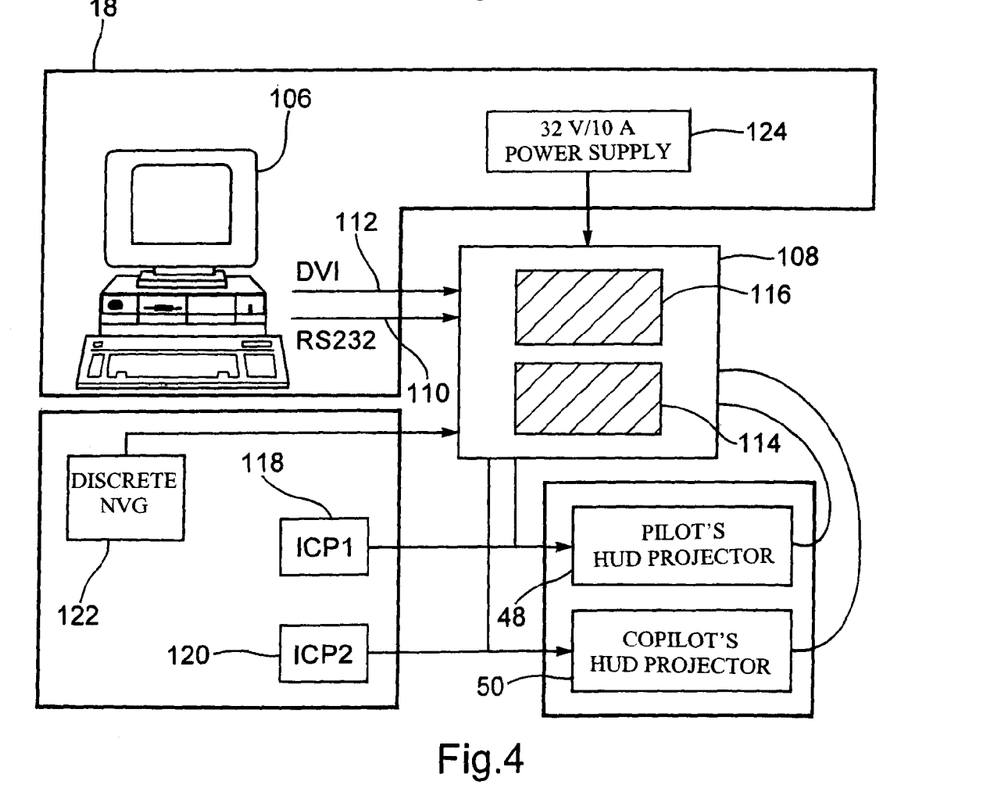
FIG. 4 is a schematic view of the master control architecture of the head up displays.

More particularly, the cockpit display screens and the head up displays are controlled independently of the other equipment items, as illustrated in FIGS. 3 and 4, to be described hereinafter.

Figure 5:
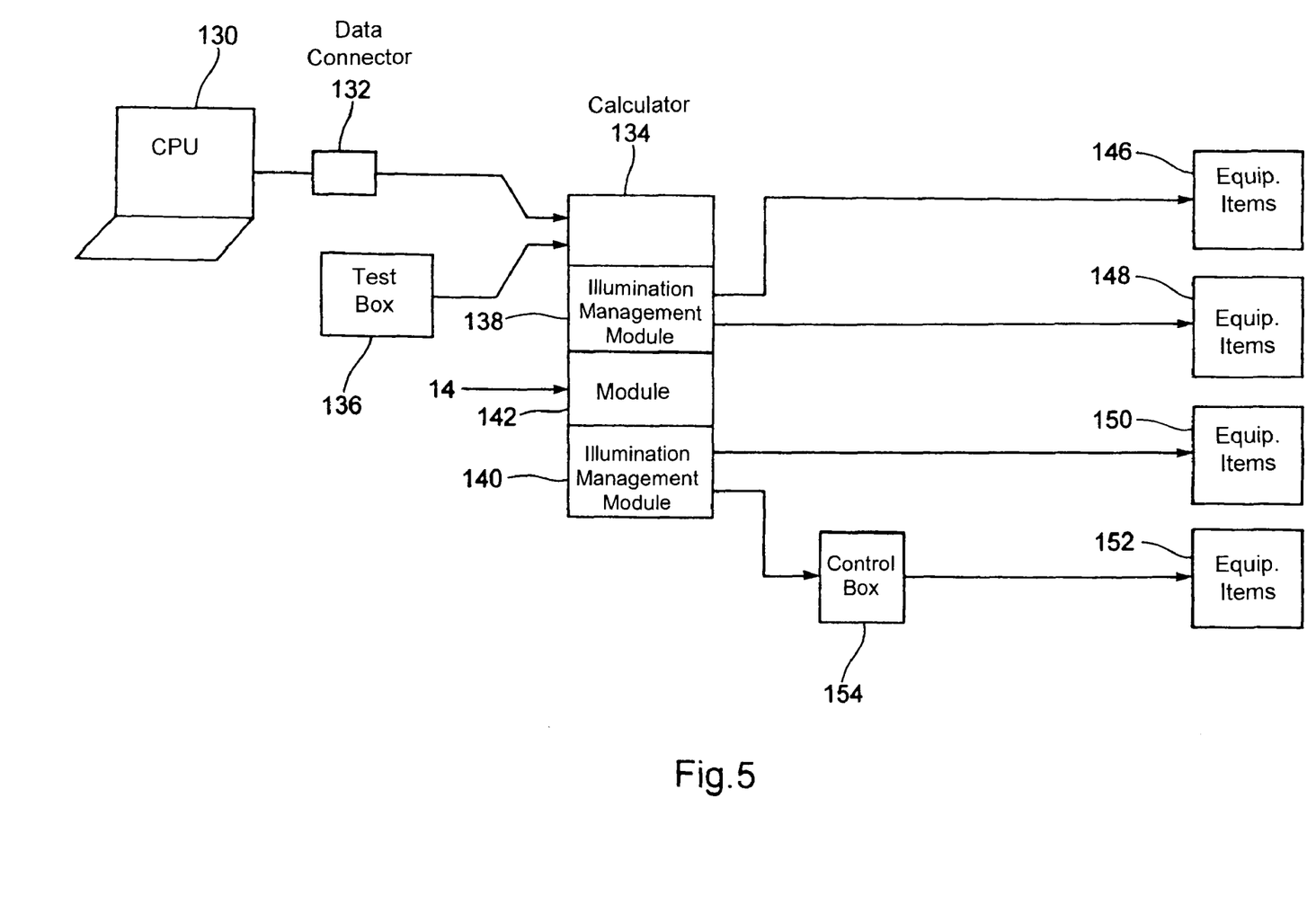
FIG. 5 is a schematic view of the master control architecture of the control panels and luminous indicators.

The control panels of the flight deck, the backlit front faces of the panels and the luminous indicators are in turn controlled as illustrated in FIG. 5, to be described hereinafter.

As illustrated schematically in FIG. 3, a calculating unit 70 in the form, for example, of a computer of the PC type, is installed in room 18 and connected to nine display screens of the flight deck, which screens are of screen types 40, 42, 44 and 46 of FIG. 2.

For the needs of construction of the mockup, the nine screens 72, 74, 76, 78, 80, 82, 84, 86, 88 of FIG. 3 are real equipment items of the flight deck, although they have been stripped of the calculators, which are normally present to read parameters, perform calculations and generate a display on the screen.

In the mockup, therefore, the nine screens are LCD-type screens.

In mockup 14, this display is generated by computer 70, which transmits video images to the screens while modulating the symbology of the displays.

More particularly, calculating unit 70 is provided with or connected to an interface card in DVI format ("Digital Video Interface" in English terminology), which is provided with four outputs via which four different images can be emitted.

These four outputs are connected by video optical cables to splitters 92, 94, 96 and 98, which in turn are connected by video optical cables to respective screens 72 to 88.

These splitters and also calculating unit 70 are all supplied by one power source, not shown.

Screen regulating elements ("rotactors" in English terminology), which correspond to rotary selectors, allow the luminous intensity of each screen to be varied, and these elements are, for example, illustrated by reference numerals 53, 55 and 61 in FIG. 2.

Thus it is understood that an illumination parameter (luminous intensity) of the equipment items can be varied manually or automatically from the flight deck, while the illumination rule for each equipment item (cockpit screen) is in turn delivered and controlled by calculating unit 70.

Calculating unit 70, which manages the illumination rules of the equipment items, is capable of varying a certain number of parameters of these illumination rules. This calculating unit selects one or more video images (choice of symbologies) and transmits them to the different screens of the flight deck.

It will also be noted that an activating element such as a switch disposed on ceiling panel 52 makes it possible, inside mockup 14, to select a mode qualified as "NVG mode", which defines a given state of illumination for the equipment items of the flight deck. Depending on this mode, the pilot or pilots use night vision goggles. A "non NVG" mode, corresponding to a test under daytime or nighttime conditions but without night vision goggles, can also be selected by this element.

When the NVG mode is activated in the flight deck, this information is transmitted via a two-wire circuit (ground/open), not shown in FIG. 3, to the different screens, so that each will consequently reduce its luminosity.

FIG. 4 illustrates the master control architecture of head up displays 48 and 52 of FIG. 2, while FIG. 3 illustrates the master control architecture of displays on the cockpit screens.

A central processing unit 106 (calculating unit), represented in the form of a PC-type computer, for example, is installed in operating room 18 of FIG. 1 and is connected to a control box 108 situated outside this room. This box could nevertheless be installed in the room and even be part of computer 106.

Box 108 is connected to the computer on the one hand by a serial circuit of RS232 type denoted by 110 in FIG. 4, in order to transmit synchronization data, and on the other hand by a video circuit (optical cable) 112 compatible with the DVI format, in order to transmit video images.

Box 108 is provided with a card 114, which converts, to the aircraft video format, video data of DVI format received via circuit 112.

Box 108 is also provided with a card 116, with which synchronization between two video image displays can be ensured.

Box 108 is connected via video optical cables to respective projectors of head up displays 48 and 50 of FIG. 2, in order to permit display of video images in the format expected by these projectors, upon instruction of processing unit 106.

Elements for regulating the illumination generated by the projectors of the head up displays are mounted on control panels ICP1 and ICP2 and represented by reference numerals 118 and 120 in FIG. 2, on the two respective sides of control panel 54.

Element 122 for activation of the "NVG mode" or "non NVG mode" transmits to control box 108 the information representative of the mode that is selected by the personnel located inside the cockpit.

A 32 V/10 A power supply denoted by 124 is installed in operating room 18 and supplies energy to control box 108.

It will be noted that calculating unit 70 of FIG. 3 and central processing unit 106 of FIG. 4 are part of control unit 16 of FIG. 1 and can be one and the same central processing unit.

It will be noted that each unit 70, 106 has a man-machine interface with which it can modify the image sent to each screen of the flight deck or to each head up display.

The interface in question makes it possible, for example, to modify the image displayed on the screen situated on the pilot's left and that represents a primary flight display of PFD type ("Primary Flight Display" in English terminology), by replacing it by an image of a navigation display of ND type ("Navigation Display").

FIG. 5, which will now be described, illustrates the master control architecture of the control panels of mockup 14, of the backlit front faces and of the luminous indicators.

A central processing unit 130, having the form of a computer of the PC type, for example, is installed in operating room 18 of FIG. 1 and is connected to a data converter 132.

The data originating from central unit 130 are effectively sent to an output bus (such as RS232) and converted to analog data.

This converter in turn is connected to an illumination-managing calculator 134 denoted by ILMU (an acronym for "Integral Lighting Management Unit" in English terminology) and also known by the term "Dimmer" in English terminology.

Unit 130 transmits parameters of illumination rules (linear, curve, etc.) to calculator 134, which consequently will process video signals intended for the equipment items in question.

A test box 136 used for diverse specific tests is connected to calculator 134, which is electrically powered.

Calculator 134 separately manages illumination control of the different control panel displays, of the backlit front faces of the panels and of the "annunciators" (luminous indicators of all kinds) via illumination management modules 138 and 140, on the basis of different and independently regulable illumination rules. Management of illumination control is effected as a function of input signals originating from mockup 14 and managed by a module 142.

More particularly, the signals delivered by mockup 14 to calculator 134 are, for example, illumination instructions originating from the flight deck. These instructions are delivered, for example, by potentiometers for regulation of the general luminosity of the cockpit and of the backlighting of the control panels (regulating elements 144 in FIG. 2). They can also be illumination instructions originating from element 122 for activating the NVG mode or the button for activating a light test ("Light Test" in English terminology; this functionality, present in all airplanes, makes it possible to turn on all the elements that can be illuminated, in order to verify the status of diodes (LEDs) and of lamp bulbs), of an illumination instruction originating from buttons that permit activation of a "Normal Dim" mode (backlighting in overcast daytime mode, corresponding to medium illumination) and of a "Normal Bright" mode (backlighting in bright daytime mode, corresponding to high-intensity illumination) respectively.

Illumination management module 138 makes it possible to activate the illumination of all of the backlit labels 146 covering the simple control panels of the types denoted by 53, 55, 57, 59, 61, 63 in FIG. 2 (described as "VU Lighted Front Face Panel" in English terminology) and of all of the backlit front faces 148 of the other control panels (described as "Cockpit Lighted Equipment FPP" in English terminology).

It will be noted that an illuminated "label" is a plate attached to the front face of a simple control panel ("Visual Units" corresponding to panels 53, 55, 57, 59, 61 and 63 in FIG. 2) equipped with buttons having indicators and constituting the front face of such a panel.

Within its thickness, the label has an assembly of diodes and electronic components that endow the underlying panel with the backlighting function.

The label is also provided with backlit captions and inscriptions.

Illumination management module 140 in turn directly manages illumination control of all of the luminous indicators 150 of the other equipment items and of the small-sized displays (on the order of a few centimeters), described as "Cockpit Lighted Equipment Annunciators" in English terminology.

Management module 140 also manages the intensity of illumination of the set 152 of indicators of the buttons on the simple panels (VU Annunciators" in English terminology) via a control box 154.

This box transforms the PWM signals ("Pulse Width Modulation" in English terminology) issued from the calculator into continuous analog signals that range between 0 and 5 V and can be received by the aforesaid illumination elements.

It will be noted in this regard that the activating signals originating from modules 138 and 140 are signals of PWM type.

Furthermore, whenever necessary, modules 138 and 140 also transmit illumination instructions to the different equipment items 146, 148, 150 and 152 to switch to NVG mode.

Depending on the circumstances, module 140 additionally transmits illumination instructions to equipment items 150 and 152 to switch to light test mode.

In this way calculator 134 is able to generate illumination rules for the different equipment items being illuminated as a function of different illumination instructions originating from the flight deck (potentiometers, NVG mode buttons, etc.).

Calculator 134, which constitutes a control unit for the aforesaid equipment items, is mounted under the floor of the mockup, for example.

It could also be located in room 18 of FIG. 1.

Central processing unit 130 is endowed with a man-machine interface, which makes it possible to vary the illumination parameters.

Figure 6:
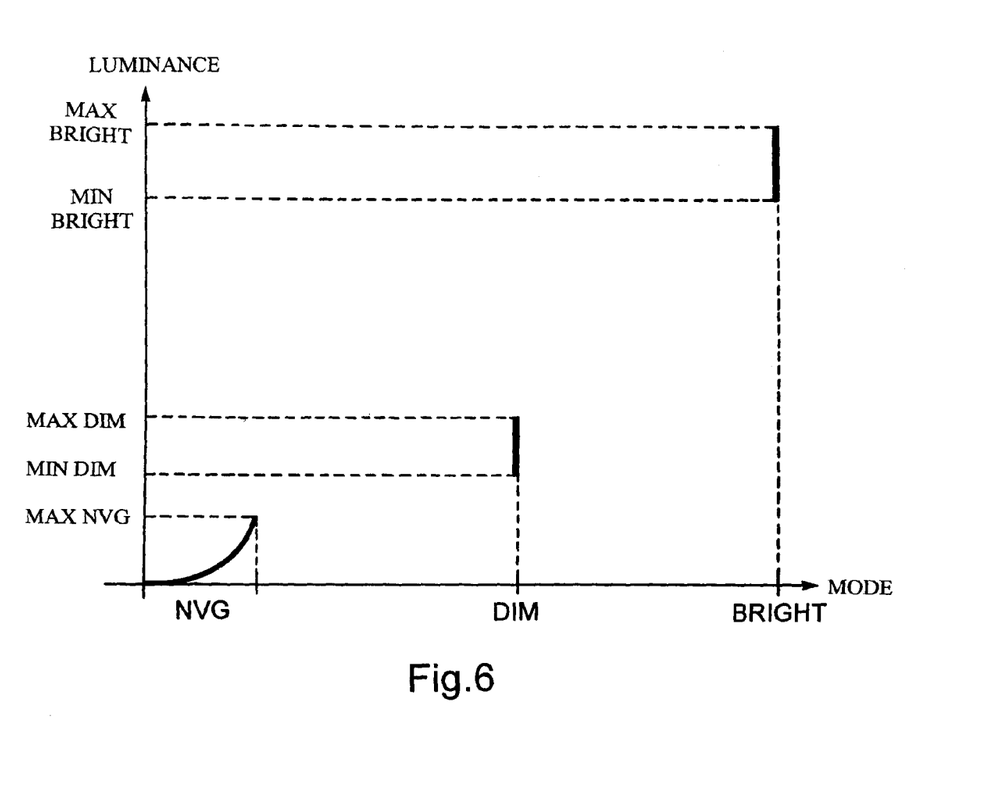
FIG. 6 is an example of an equipment luminance rule managed by calculator 134 of FIG. 5.

FIG. 6 shows a curve of a typical illumination rule as a function of the "NVG", "Normal Dim" and "Normal Bright" modes selected by the personnel using the mockup. This illumination rule expresses the luminance as a function of the chosen mode.

Thus, with reference to FIGS. 3 to 6, a description has just been given of the control architecture for illumination of the different equipment items that illuminate mockup 14 of the flight deck, or in other words the screens of the flight deck (FIG. 3), the head up displays (FIG. 4) and the control panels and "annunciators" (FIGS. 5 and 6).

By virtue of these means for master control of the illumination of equipment items, tool 10 of FIG. 1 is capable of reproducing an entire set of possible illumination configurations inside the flight deck by varying the screen displays (any desired image format can be displayed on any desired screen), the symbologies of the head up displays, by turning different indicators on or off, by adjusting the backlighting of control panels, the ambient lights, the luminosities of screens or head up displays and the intensity of reading lamps.

This illumination management is ensured by software applications resident in the aforesaid computers or central processing units and calculators.

The master control means enumerated hereinabove make it possible to vary the illumination parameters of equipment items and, for example, the illumination rules thereof, as illustrated in FIG. 6, in order to reconstitute the different operational situations that may occur under real conditions of use of an aircraft flight deck.

By configuring the mockup in NVG mode, it is possible to activate a predefined state of illumination for the equipment items (screens, head up displays, control panels, indicators, etc.).

As mentioned hereinabove, by appropriate choice of the different possible illumination configurations of the equipment items of mockup 14 and of the darkness level selected (the darkness level is not necessarily modified for each illumination configuration), qualitative tests can be performed with pilots equipped with night vision systems in order to verify the compatibility of these equipment items with the night vision system under consideration.

It will be noted that it is possible to choose to illuminate only certain equipment items of the mockup, in order to verify their compatibility in isolated manner, rather than verifying only the compatibility of a set of illuminated equipment items.

Figure 7:
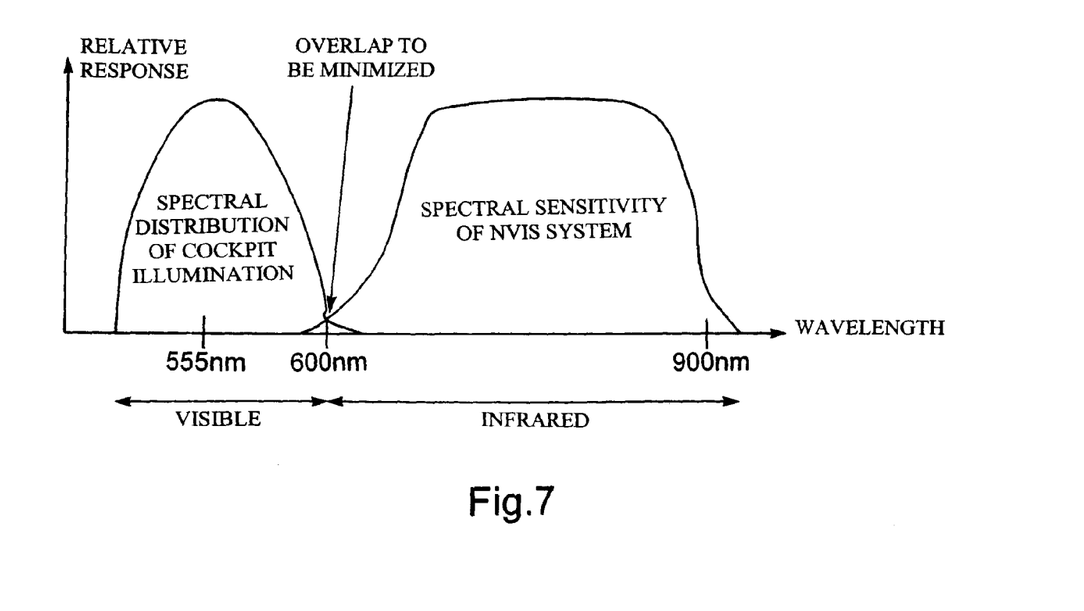
FIG. 7 illustrates the principle of spectral distribution of an aircraft flight deck compatible with a night vision system.

The tool for assisting in configuring a flight deck compatible with night vision systems makes it possible to be certain that the spectral distribution of the illumination generated by the equipment items of the flight deck interferes not at all or only slightly with the spectral sensitivity of the night vision system, as illustrated in FIG. 7.

In this figure, the luminous energy emitted by the illuminated elements of the flight deck is emitted in the visible, except for a small component in the near infrared, whereas the luminous energy to which the night vision system is sensitive is located mainly in the infrared, except for an unavoidable overlap in the visible wavelength band around 600 nm.

The different types of night vision systems in the form of night vision goggles include the following types:

type I, which uses third-generation image amplification tubes and displays the intensified image on a phosphor screen directly in the user's line of sight;

type II, which also uses third-generation image amplification tubes, but provides for projection of the intensified image through a dedicated means (an example of such a means is one of the "combiner" type, which is a glass lens of complex shape, permitting the pilot to collimate the image projected by the HUD projector at infinity) onto the user's line of sight; this type of night vision system permits the user to perceive another visual signal, such as a symbology of a head up display, while at the same time using the night vision system and looking at an external scene.

Among the type II night vision systems, a distinction is made between the following three classes of systems:

the class A systems, which use a lens forming a low-pass filter with a cutoff frequency corresponding to the 625 nm wavelength; night vision systems of this class are incompatible with the use of red indicators in the cockpit, because the overlap between the illumination spectrum of these indicators and the sensitivity spectrum of the night vision system is too broad;

the class B systems, which use a lens forming a low-pass filter with a cutoff frequency corresponding to a wavelength of 665 nm; night vision systems of this class are compatible with the use of correctly filtered red indicators as well as with the use of electronic color displays that meet certain specifications (as an example, the displays for this class of systems effectively must not use colors, such as the color red, that would prove annoying under the conditions of use of NVG);

the class C systems, which use a lens forming a low-pass filter and are provided with pass band for the wavelength of green color; the night vision systems of this class are particularly suitable for use with head up displays, which use only a single wavelength; in fact, it is almost impossible to discern the symbology of head up displays with a night vision system of class A or B; it is for this reason that there is added a filter having a pass band that brackets the green wavelength and is located between 520 and 570 nm.

Figure 8:
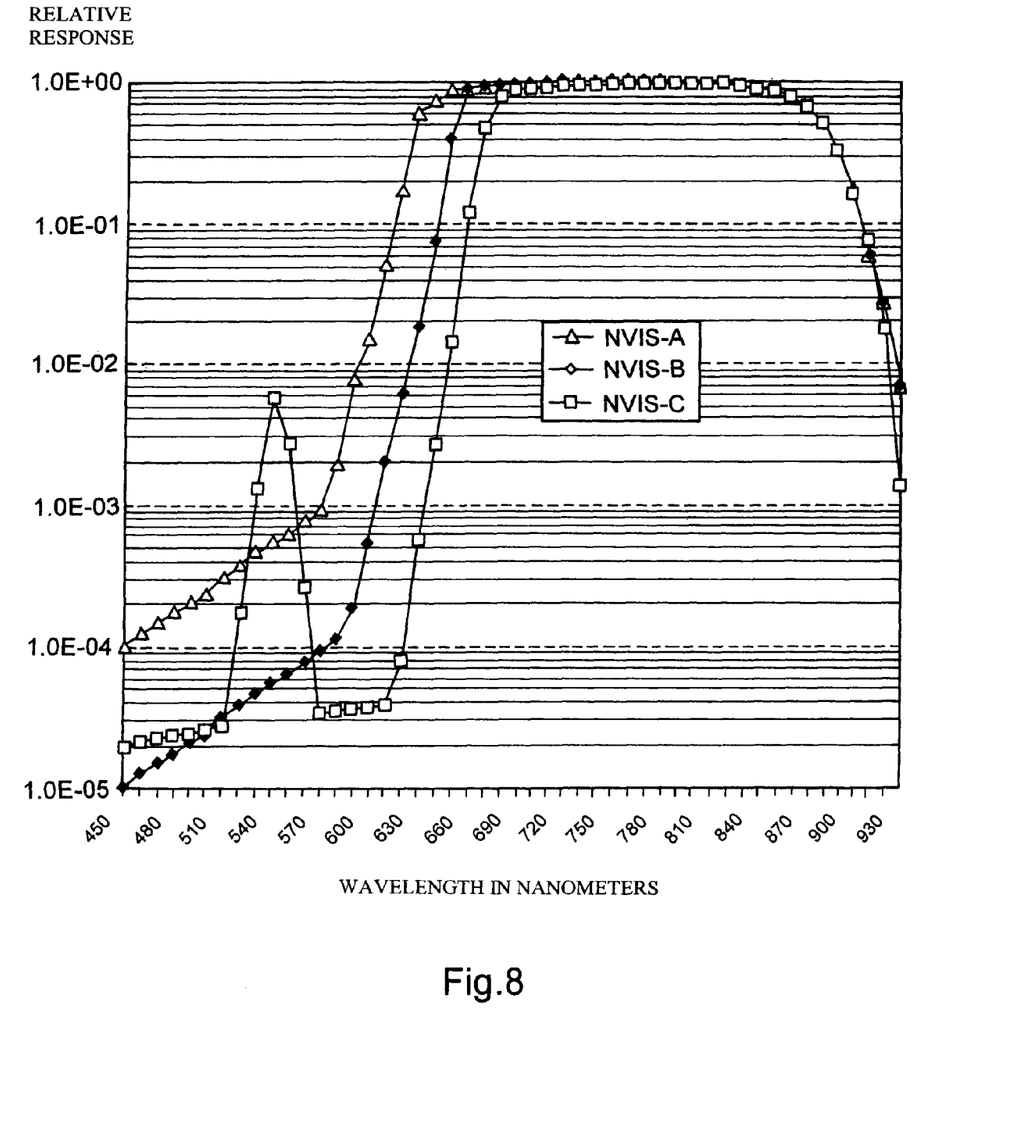
FIG. 8 illustrates a diagram of the spectral sensitivities of the different classes of type II night vision systems.

FIG. 8 shows the theoretical curves of spectral sensitivity of the different classes A, B and C of type II night vision systems.

Thus, when the illumination of cockpit mockup 14 is activated in night vision mode ("NVG mode"), the measurements recorded by measuring apparatus 28 (measurements of chromaticity, of spectral radiance, of luminance and of illuminance) will be compared with reference data that define a threshold of compatibility with one or more known night vision systems.

These reference data are obtained empirically, for example.

It is also possible to use standard documents to obtain such reference data.

It will be noted that the reference data can be refined for a given equipment item by correlation between the measurements performed and the subjective comments of persons equipped with NVG systems.

During quantitative measurements, all of the equipment items to be illuminated in the flight deck are under voltage in operating room 18 of tool 10. Thus illumination of the selected equipment item or items can be activated and the different elements to be illuminated in the flight deck can be parameterized as a function of the illumination configuration desired for the flight deck in the test under consideration.

During the test, the NVG mode is selected inside the mockup and the light source 22 is configured to reproduce a given nighttime level among the plurality of the aforesaid darkness levels.

Among the measurements envisioned, it is possible to make a measurement of chromaticity at any point of the equipment items of the mockup.

More particularly, the chromaticity represents the color of the luminous information being emitted by the indicators, the displays, the screens, the head up displays, the reading lamps or other ambient lights.

In 1976 the Commission on Illumination published the UCS diagram ("Uniform Chromaticity Scale" in English terminology), which represents a Chromaticity Scale.

Figure 9:
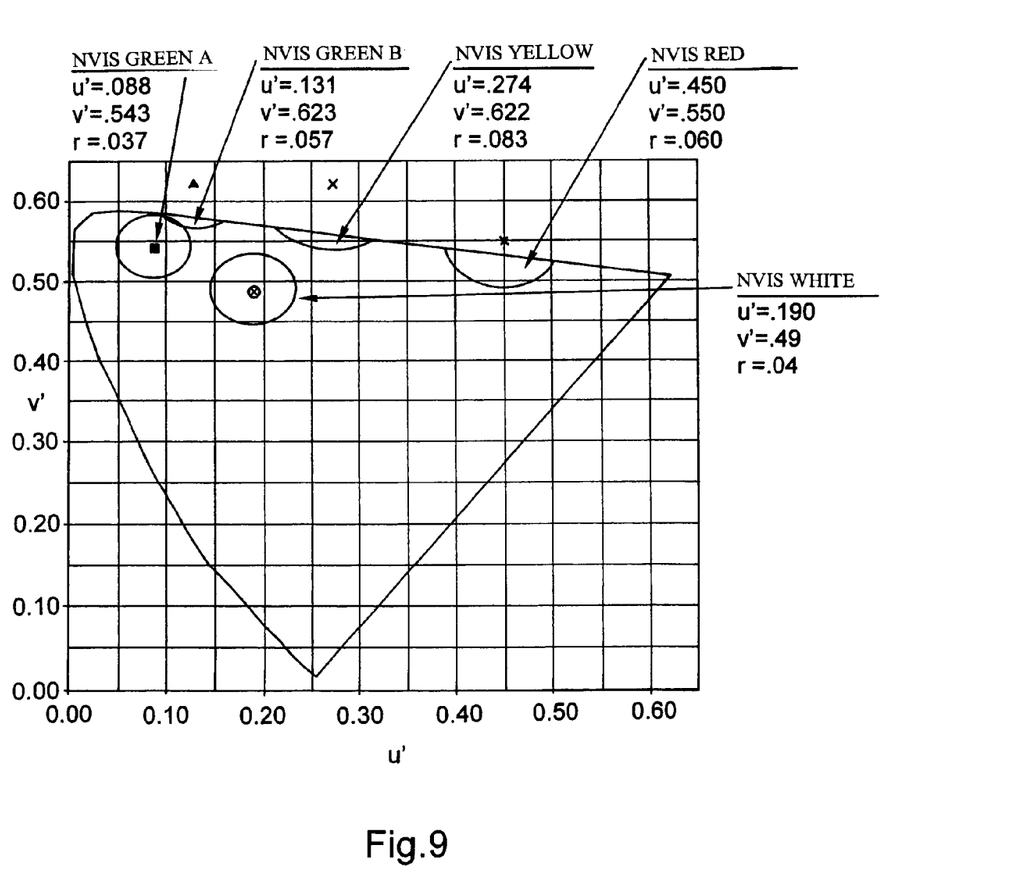
FIG. 9 represents a diagram of the CIE chromatic coordinates according to the 1976 UCS.

In that diagram, which is illustrated in FIG. 9, the coordinates u, v and r are attributed to colors, and different color zones (green A, green B, red, yellow and white, where the letters A and B refer to classes A and B of NVG systems) identified by the references "NVIS green A", "NVIS green B", "NVIS red", "NVIS yellow" and "NVIS white" have been represented. These zones define the threshold of compatibility with a night vision system for an illuminated element located in the flight deck and having chromatic coordinates within the zone under consideration.

Thus, for an illuminated element in a predefined, activated state of illumination to be compatible with one of the classifications of night vision systems mentioned hereinabove (type I, type II class A, class B or class C), it is necessary that its chromatic coordinates satisfy the following formula:

$$(u'-u'1)2+(v'-v'1)2 \leq r2,$$

where u' and v' are the chromatic coordinates of the 1976 UCS diagram of the illuminated element, u'1 and v'1 are the 1976 UCS chromatic coordinates of the central point of the zone under consideration among the five zones mentioned hereinabove, and r is the radius authorized inside a zone for compatibility with a night vision classification.

Thus, when the illuminated element is situated inside one or the other of the five zones under consideration, that means that it is compatible with a given night vision system.

Figure 10:
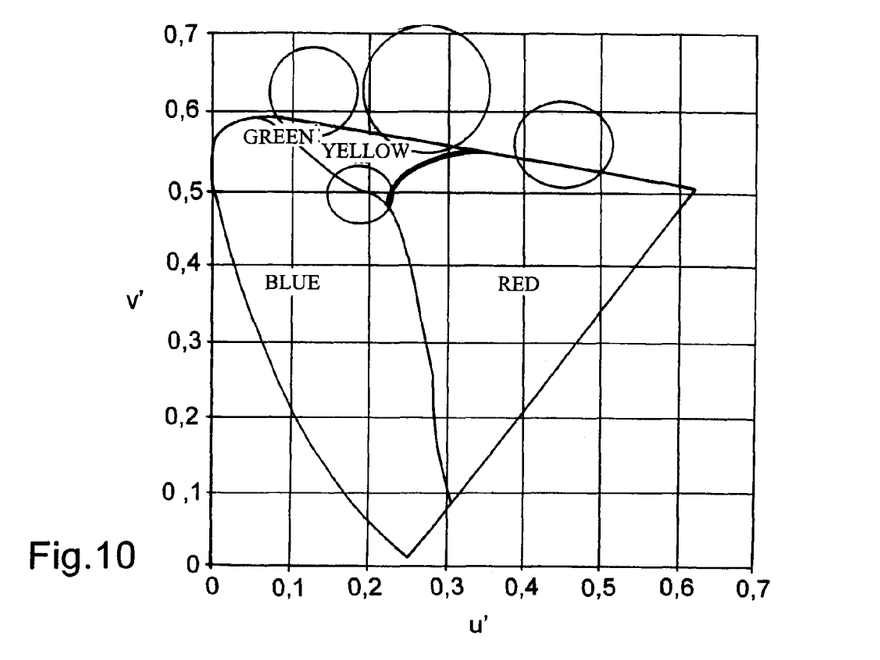
FIG. 10 is an example of chromaticity measurements made on a control panel and plotted on the diagram of FIG. 9.

FIG. 10 shows an example of chromaticity measurements made on a control panel for oxygen regulation. This is an equipment item found in the lateral banks of the cockpit visible in FIG. 1, on the left and right sides respectively of the seats of the pilot and copilot. For this equipment item, the illumination is provided only by backlighting of the front face, because it does not have any buttons or displays.

These measurements were made on the illuminated equipment item alone by receiving the illumination of the backlit front face of the panel by means of sensor 32 of measuring apparatus 28.

Different regions marked with names of colors ("blue", "red", "yellow", "green"), according to the color of the region under consideration, are shown in this figure.

The color zones identified in FIG. 9 are also represented by circles and a portion of a circle.

Comparison of these results with the chromatic diagram of FIG. 9 permits the person skilled in the art to appraise the NVG compatibility of the equipment item.

It is also appropriate to take into account the results of qualitative measurements representing the subjective opinions of persons having worn NVG systems while the equipment item in question was illuminated.

To make such measurements on a more complex control panel, such as panel 52 in FIG. 2, the measurements can be conducted in several possible configurations, such as nominal panel mode, panel mode with everything turned on, nominal panel mode with one particular luminous signal ("warning") activated, "DIM", "BRIGHT" illuminated panel mode, etc.

Figure 11:
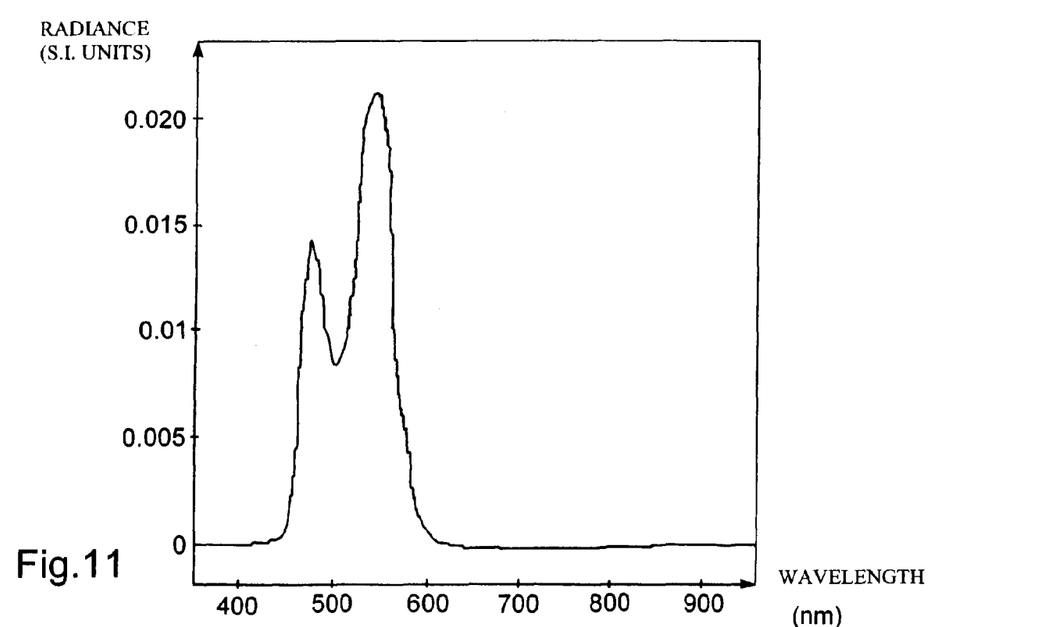
FIG. 11 illustrates an example of radiance measurements made on a control panel.

FIG. 11 shows an example of radiance measurements made on a control panel.

These measurements make it possible to detect the wavelengths at which the panel emits light and, by comparison with reference data, to verify the NVG compatibility of the panel for a given type of NVG system.

It will be noted that, for a given equipment item, the general approach is to measure at least one luminous characteristic (chromaticity, radiance, luminance, illuminance) independently for each of several illuminated elements (backlit front face, button indicators, warnings) in some, most or all possible illumination configurations of the equipment. The measurements are then made with all elements illuminated at the same time in some, most or all possible illumination configurations, in order to be certain of the NVG compatibility of the equipment.

This approach is followed for all equipment items of the mockup of the flight deck and, when all measurements are being made on a given equipment item, the other equipment items may or may not be illuminated depending on the objective being sought.

Thus, by virtue of the measurements of luminous characteristics of elements of the flight deck that are illuminated according to an activated state of illumination, it is possible, by comparison with templates (reference data), to verify the compatibility, with a night vision system NVG, of illuminated elements and more generally of the equipment items of which they are part.

As already mentioned, the results of these measurements and comparisons can be correlated with qualitative measurements made in cooperation with one or more pilots equipped with a night vision system.

This correlation therefore makes it possible to refute or confirm the results of the quantitative measurements and also to obtain supplementary information, for example concerning the visual comfort felt by the pilot, the ergonomics of certain equipment items, etc.

Following such tests, it is therefore possible to modify the ergonomic configuration of the flight deck of an aircraft, to give preference to certain illumination configurations of the flight deck compared with others (example: regulation of luminous intensities of certain equipment items compared with others), to validate certain equipment items or to make modifications thereto.

The tool according to the invention is very efficient for measurement, inasmuch as it makes it possible to test the compatibility of an aircraft cockpit with a night vision system even before the aircraft is placed in service.

In this sense, the tool according to the invention makes it possible to improve safety for pilots during test flights.

The invention claimed is:

1. A tool for assisting in design of an aircraft flight deck compatible with a night vision system, the tool comprising:
    a closed chamber configured to function as a dark room and including
        a mockup configured to reproduce an interior of a flight deck and configured to be representative of visual characteristics of the flight deck, the mockup configured to include equipment items that each produce an illumination and that are representative of the flight deck, and the mockup configured to reproduce a plurality of combinations of the illumination produced by the equipment items of the flight deck on command, the plurality of combinations of the illumination including a first combination having illumination of only one equipment item and a second combination having illumination of a subset of the equipment items, the first combination and the second combination being different,
        a light source configured to reproduce at least one level of darkness in the chamber,
        a measuring apparatus configured to measure, at a physical location in the mockup, at least one physical variable of each of the first combination and the second combination, the physical location corresponding to a location of the night vision system when mounted on a helmet of a pilot seated in the mockup, and
        a determining apparatus configured to determine whether each of the first combination and the second combination is compatible with the night vision system based on the measured at least one physical variable of each of the first combination and the second combination and based on reference data of the night vision system.

2. The tool according to claim 1, wherein
    the equipment items of the flight deck are in a predefined, activated state of illumination.

3. The tool according to claim 1, further comprising:
    at least one illumination control unit connected to the equipment items and configured to permit the illumination of the equipment items to be activated and adjusted.

4. The tool according to claim 3, wherein the at least one illumination control unit is mounted in the chamber.

5. The tool according to claim 1, wherein the at least one physical variable is chosen from among at least one of the following variables: chromaticity, spectral radiance, luminance, illuminance.

6. The tool according to claim 2, wherein the measuring apparatus is a spectroradiometer.

7. The tool according to claim 2, wherein the measuring apparatus is mounted in the mockup of the inside of the flight deck.

8. The tool according to claim 1, wherein the light source is configured to reproduce a plurality of darkness levels.

9. The tool according to claim 1, further comprising:
at least one attenuating filter associated with the light source for each darkness level.

10. The tool according to claim 1, further comprising:
a resolution pattern mounted opposite the mockup and illuminated by the light source.

11. The tool according to claim 1, wherein the night vision system includes night vision goggles.

12. The tool according to claim 1, wherein the mockup is further configured to be representative of tactile characteristics of the flight deck.

13. The tool according to claim 1, wherein:
the at least one physical variable of each of the first combination and the second combination includes a spectral distribution;
the reference data of the night vision system includes a spectral sensitivity; and
the determining apparatus determines whether each of the first combination and the second combination is compatible with the night vision system by determining whether the spectral distribution interferes with the spectral sensitivity.

14. The tool according to claim 1, wherein:
the at least one physical variable of each of the first combination and the second combination includes chromatic coordinates; and
the determining apparatus determines whether each of the first combination and the second combination is compatible with the night vision system by comparing the chromatic coordinates of each of the first combination and the second combination with chromatic coordinates of a central point of a compatibility zone of the night vision system and with a predetermined radius inside the compatibility zone.

15. The tool according to claim 1, wherein:
the at least one physical variable of each of the first combination and the second combination includes first wavelengths;
the reference data of the night vision system includes second wavelengths; and
the determining apparatus determines whether each of the first combination and the second combination is compatible with the night vision system by comparing the first wavelengths with the second wavelengths.

16. The tool according to claim 1, wherein the equipment items of the flight deck include at least one of cockpit screens, head-up displays, and control panel displays.

17. The tool according to claim 1, wherein the light source is configured to reproduce a plurality of darkness levels that correspond to different luminous environments in the interior of the flight deck, the different luminous environments corresponding to different night time environments outside an aircraft.

18. The tool according to claim 1, wherein
the measuring apparatus is configured to measure, at a second physical location in the mockup, a second physical variable of the illumination of a third combination, and
the determining apparatus is configured to determine whether the third combination is compatible with the night vision system based on the measured second physical variable of the illumination of the third combination and based on the reference data of the night vision system.

19. A method for assisting in the design of an aircraft flight deck compatible with a night vision system, the method comprising:
reproducing an interior of a flight deck using a mockup including equipment items that each produce an illumination, and representing visual characteristics of the flight deck;
reproducing a plurality of combinations of the illumination produced by the equipment items of the flight deck on command using the mockup, the plurality of combinations of the illumination including a first combination having illumination of only one equipment item and a second combination having illumination of a subset of the equipment items, the first combination and the second combination being different;
reproducing, using a light source, at least one level of darkness in a closed chamber that functions as a dark room;
measuring, at a physical location in the mockup, at least one physical variable of each of the first combination and the second combination, the physical location corresponding to a location of the night vision system when mounted on a helmet of a pilot seated in the mockup; and
determining whether each of the first combination and the second combination is compatible with the night vision system based on the measured at least one physical variable of each of the first combination and the second combination and based on reference data of the night vision system.

20. The method according to claim 19, further comprising:
activating a predefined state of illumination of one or more equipment items.

21. The method according to claim 19, wherein
the at least one physical variable includes at least one of the following variables: chromaticity, spectral radiance, luminance, illuminance.

22. A tool for assisting in design of an aircraft flight deck compatible with a night vision system, the tool comprising:
a closed chamber configured to function as a dark room and including
a mockup configured to reproduce an interior of a flight deck and configured to be representative of visual characteristics of the flight deck, the mockup configured to include equipment items that are representative of the flight deck and that reproduce a plurality of possible illumination configurations of the flight deck on command, the plurality of possible illumination configurations including a first configuration having illumination of only one equipment item and a second configuration having illumination of a subset of the equipment items, the first configuration and the second configuration being different,
a light source configured to reproduce at least one level of darkness in the chamber,
an illumination control unit connected to the equipment items and configured to selectively activate and adjust illumination of each of the equipment items of the flight deck,
a measuring apparatus configured to measure, at a physical location in the mockup, at least one physical variable of each of the first configuration and the second configuration, the physical location corresponding to a location of the night vision system when mounted on a helmet of a pilot seated in the mockup, and a determining apparatus configured to determine, in response to the illumination by the illumination control unit, whether each of the first configuration and the second configuration is compatible with the night vision system based on the measured at least one physical variable of each of the first configuration and the second configuration and based on reference data of the night vision system.

23. A method for assisting in the design of an aircraft flight deck compatible with a night vision system, the method comprising:

reproducing an interior of a flight deck using a mockup including equipment items that each produce an illumination, and representing visual characteristics of the flight deck;

reproducing a plurality of combinations of the illumination produced by the equipment items of the flight deck on command using the mockup;

reproducing, using a light source, at least one level of darkness in a closed chamber that functions as a dark room;

determining whether each of the equipment items of the flight deck are compatible with the night vision system based on at least one physical variable relating to illumination of each of the equipment items of the flight deck and based on reference data of the night vision system; and spatially rearranging at least one of the equipment items in the mockup based on the determining, the spatially rearranging including changing a location of the at least one of the equipment items in the mockup.

24. The method according to claim 23, further comprising:

changing a location of one of a dial, switch, button, and rotary selector of the at least one of the equipment items in the mockup based on the determining.

* * * * *